United States Patent [19]
Lienau et al.

[11] 3,852,430

[45] Dec. 3, 1974

[54] METHOD FOR THE PRODUCTION OF CONCENTRATED HYDROHALOGEN ACIDS AND METAL OXIDES

[75] Inventors: Rainer Lienau, Planegg; Friedrich Hofmann, Saarbruecken, both of Germany

[73] Assignee: Sud-Chemie Aktiengesellschaft, Munich, Germany

[22] Filed: Oct. 18, 1971

[21] Appl. No.: 190,259

Related U.S. Application Data

[62] Division of Ser. No. 38,185, May 18, 1970, Pat. No. 3,658,483.

[52] U.S. Cl. ............... 423/481, 423/483, 423/488, 423/512, 423/604, 423/625, 423/632, 423/635
[51] Int. Cl. ........ C01b 7/00, C01b 7/08, C01g 1/02
[58] Field of Search ........... 423/481, 488, 604, 592, 423/483, 625, 632, 635; 23/277 C

[56] References Cited
UNITED STATES PATENTS

| | | | |
|---|---|---|---|
| 2,155,119 | 4/1939 | Ebner | 423/604 |
| 2,413,292 | 12/1946 | Christensen | 423/481 |
| 2,471,844 | 5/1949 | Strelzoff | 423/481 |
| 2,545,314 | 3/1951 | Seebold | 423/481 |
| 3,399,964 | 9/1968 | Michels et al. | 423/488 |
| 3,658,483 | 4/1972 | Lienau et al. | 423/481 |
| 3,682,592 | 8/1972 | Kovacs | 423/488 |

FOREIGN PATENTS OR APPLICATIONS

| | | | |
|---|---|---|---|
| 793,700 | 4/1958 | Great Britain | 423/481 |

*Primary Examiner*—Edward Stern
*Attorney, Agent, or Firm*—Burgess, Dinklage & Sprung

[57] ABSTRACT

Highly concentrated aqueous hydrohalogen acids and metal oxides are produced from aqueous solutions of the halides of divalent and/or polyvalent metals by pre-concentrating the aqueous starting solution, evaporating the pre-concentrated solution to a solids content of about 40 to 60 percent by weight by direct contact with a fluid heat carrier and then directly introducing the concentrate into a decomposition unit having a stationary reaction chamber wherein the metal halides are decomposed at elevated temperatures in the presence of water vapor to form the hydrogen halide and the corresponding metal oxides.

14 Claims, 3 Drawing Figures

METHOD FOR THE PRODUCTION OF CONCENTRATED HYDROHALOGEN ACIDS AND METAL OXIDES

This is a division of application Ser. No. 38,185 filed May 18, 1970, now U.S. Pat. No. 3,658,483 issued Apr 25, 1972.

This invention relates to the method and apparatus for the production of a highly concentrated aqueous hydrohalogen acid and metal oxides from aqueous solutions of halides of divalent and/or polyvalent metals.

BACKGROUND

There are known methods to recover hydrochloric acid from aqueous industrial wastes which contain chlorides, especially of iron and aluminum. These methods are based on the fact that the chlorides mentioned are decomposed at higher temperatures in the presence of water vapor, to form hydrogen chloride and the corresponding metal oxides.

For this reaction, a certain minimum amount of water vapor is necessary. Since, however, the chlorides are present in very dilute aqueous solutions, water is present in a large excess. In order to evaporate such solutions in the decomposition unit, it is necessary to supply a large excess of heat energy over the heat energy which is required for the decomposition process itself.

In the subsequent absorption of the hydrogen chloride this excess water vapor contained in the gases of the decomposition unit will necessarily have to be condensed together with the hydrogen chloride, and it is not possible to obtain an acid having a concentration of about 30 percent which concentration is necessary for many industrial applications. Both, in order to reduce the energy consumption in the decomposition unit, and to produce an acid having a sufficiently high concentration, it is necessary to evaporate the chloride solution as far as possible before passing it into the decomposition unit.

Known decompositions units comprising several subsequent steps with evaporators heated by means of steam or vapors containing steam and flue gases soon reach their efficiency limit since no precipitation of salts or only a minor precipitation of salts can be tolerated. Otherwise, there will be the danger that crusts will form on the heating surfaces.

In addition, if the attempt is made to obtain a higher concentration (e.g. more than 50 percent by weight of solids), the boiling point of the solution increases to about 145°C and higher. In order to heat the concentration unit, the known methods require the use of live steam or high pressure steam of at least 6 atmospheres gauge. Such steam is naturally more expensive than the waste steam commonly used for heating evaporators.

These difficulties also occur if other hydrohalogen acids are to be recovered in high concentrations from metal halides other than the chlorides.

SUMMARY

The present invention eliminates these difficulties. The invention also provides a method having an especially high heat economy. In addition, the invention prevents the escape of hydrogen halides into the atmosphere.

Generally, the invention relates to a method of producing a highly concentrated aqueous hydrohalogen acid and metal oxides from aqueous solutions of the halides of divalent and/or polyvalent metals wherein the metal halides are decomposed at higher temperatures in the presence of water vapor to form the hydrogen halide and the corresponding metal oxides; the method is characterized in that a starting solution containing metal halides is pre-concentrated, the pre-concentrated solution containing the metal halides is evaporated to a solids content of approximately 40 to 60 percent by weight, preferably of at least 50 percent by weight, by direct contact with a fluid heat carrier, and the concentrate is directly introduced into a decomposition unit having a stationary reaction chamber.

THE DRAWINGS

DESCRIPTION

Figure 1:
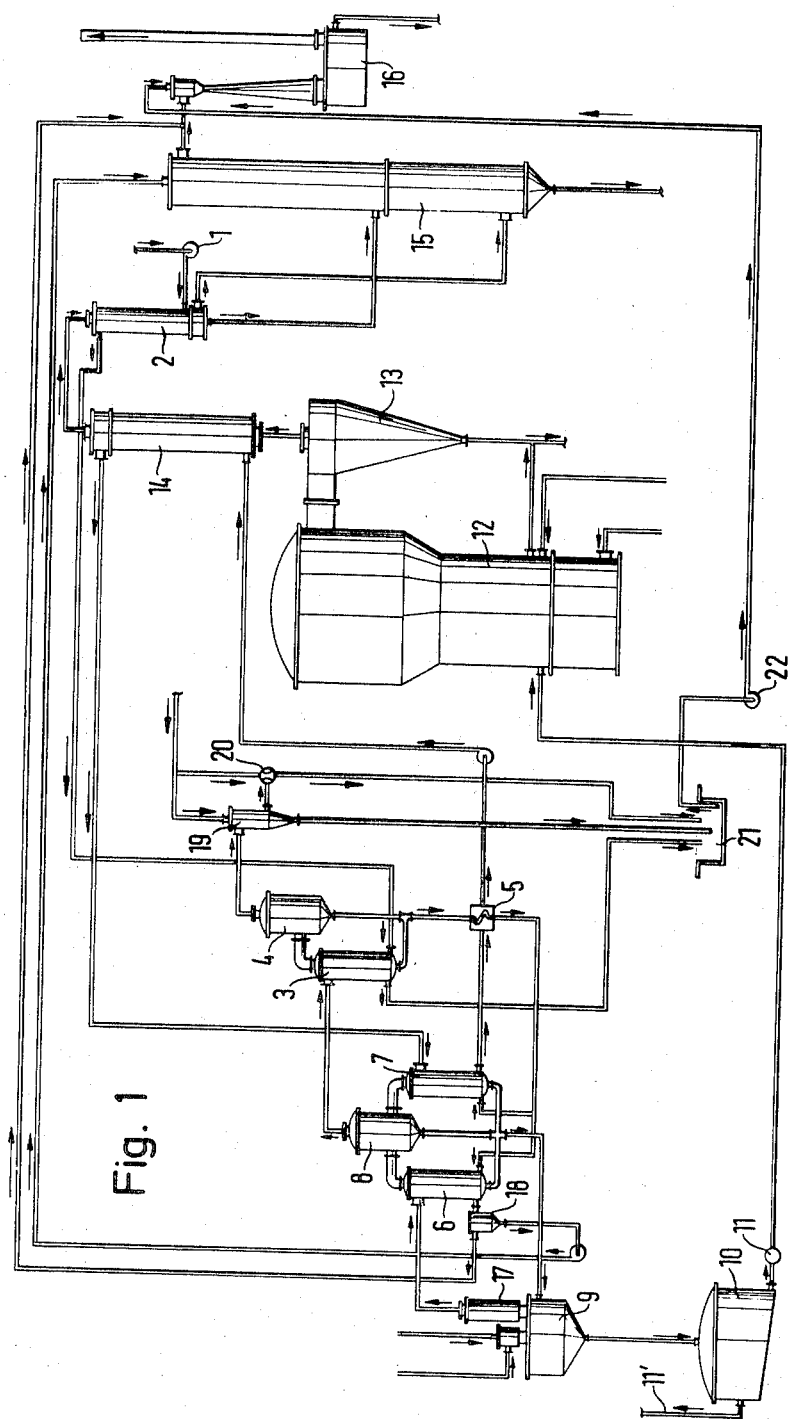
FIG. 1 is a flow sheet of one embodiment of the apparatus according to the invention.

Spray roasters, high turbulence reactors or, preferably, fluidized bed reactors may be used as decomposition units.

In practice, the method is carried out preferably using a preconcentrated solution containing metal chlorides which solution is evaporated to a solids content of approximately 40 to 60 percent by weight, preferably of at least 50 percent by weight, prior to the decomposition. For reasons of simplicity, the following disclosure only relates to the recovery of highly concentrated hydrochloric acid from aqueous solutions containing metal chlorides, but hydrofluoric acid, hydrobromic acid and hydroiodic acid may be recovered as well in a similar manner.

In the method according to the invention, for example, aqueous solutions of aluminum chloride, iron chloride, copper chloride alkaline earth metal chlorides or their mixtures are used. These solutions are, for instance, obtained in the processing of bleaching earths with hydrochloric acid. The starting solutions obtained in this process generally have a solids content of approximately 5 to 15 percent by weight and contain (based on the total solids) approximately 50 to 70 percent by weight $AlCl_3$, 10 to 20 percent by weight iron chlorides, 5 to 12 percent by weight $CaCl_2$ and 5 to 12 percent by weight $MgCl_2$.

The method according to the present invention is also applicable to any other metal halide solution, preferably metal chloride solution in which the halides are decomposed at high temperatures to form the corresponding hydrogen halides and metal oxides. Examples for such solutions are hydrochloric acid solutions obtained in the processing of titanium ores and of the magnesium chloride-containing waste liquors in the potash industry.

If the metal halide-containing solution is a solution which comprises aluminum chloride, iron chloride and alkaline earth metal chlorides, at first solid aluminum chloride hydrate and subsequently the other chlorides are precipitated when such solution is evaporated. According to a preferred embodiment of the method according to the present invention, the metal halide crystallizing first from the evaporated solution is separated in solid form, the remaining solution is again evaporated by direct contact with a fluid heat carrier, optionally the next-precipitating metal halide or metal halides are separated in solid form and finally the again evaporated residual solution and optionally the solid metal halide or metal halides are separately subjected to decomposition.

In this way it is, for instance, possible to obtain aluminum oxide in high purity from aluminum chloride. This aluminum oxide may, for instance, be used as an adsorbent, as a carrier for catalysts, in the porcelain industry, for the production of aluminum and for all other known applications of aluminum oxide. The same is true for the pure iron oxide obtained from iron chloride which may, for instance, be used as a pigment, and for the pure magnesium oxide obtained from magnesium chloride which may, for instance, be used for the production of highly refractory materials.

It is also possible to use the solid aluminum chloride as such, i.e. only the iron chloride and the alkaline earth metal chlorides are decomposed to form hydrogen chloride and the corresponding metal oxides.

A further advantage of the fractional crystallization is the improved heat economy since less water has to be evaporated during the decomposition of the solid halides.

The concentration of the metal halide solution by direct contact with a fluid heat carrier avoids the crust formations obtained when using indirectly heated heat exchange surfaces. Fluid heat carriers are preferably the combustion gases of submerged combustion evaporators which are directly passed into the solution to be concentrated. Other hot flue gases and heated gases in general, or hot, water-immiscible liquids may be passed into the solutions to be concentrated.

In order to reduce the energy requirements necessary for the concentration of the metal halide solutions, it is further proposed to pre-concentrate the solution in at least one vacuum unit ahead of the concentration unit using the fluid heat carrier, which vacuum units are indirectly heated by the waste gases of the concentration unit, for instance by means of the vapors (containing steam and flue gases) of the submerged combustion evaporator or immersion burner. Preferably, two vacuum units are used.

Since only a small relative increase in the concentration occurs in these pre-concentration units in spite of the absolute amount of water evaporated being large, there is no danger that deposits or crusts are formed on the heating surfaces of these units. The submerged combustion evaporator, however, in which the final concentration takes place, has no heating surfaces and is substantially insensitive against fouling and crust deposition.

A further reduction of the energy consumption may be achieved by pre-concentrating the metal halide solution in at least one vacuum unit ahead of the concentration unit with the fluid heat carrier which vacuum unit is indirectly heated by the heat removed from the reaction gases of the decomposition unit.

When two vacuum units are used, the second unit (as seen in the direction of flow of the halide solution) is preferably heated indirectly by the heat removed from the reaction gases of the decomposition unit, whereas the first vacuum unit is preferably indirectly heated by the flue gases coming from the concentration unit.

After the reaction gases from the decomposition unit which comprise flue gas, hydrogen halide and steam, have transferred their heat to a heat carrier for heating the second vacuum unit, they are preferably passed into a combined absorption unit consisting of an isothermic and a subsequent adiabatic part in which they are condensed and absorbed, respectively, to yield a highly concentrated hydrohalogen acid. To cool the isothermic part of the absorption unit, preferably the metal halide-containing initial feed solution is used as the cooling medium; as the absorption liquid for the adiabatic part of the absorption unit, preferably the condensate of the flue gases from the concentration unit is used.

The present invention also relates to an apparatus for carrying out the process according to the invention.

This apparatus is characterized by (a) at least one unit for the pre-concentration of the solution, (b) a concentration unit in which the pre-concentrated, metal halide-containing solution is evaporated by indirect contact with a fluid heat carrier to a solids concentration of approximately 40 to 60 percent by weight, preferably of at least 50 percent by weight, (c) at least one decomposition unit following the concentration unit, having a stationary reaction chamber, (d) means following the decomposition unit for cooling the reaction gases from the decomposition unit and (e) means for the absorption and condensation of the hydrogen halide formed in the decomposition unit. Preferably, the unit or units for the pre-concentration are vacuum units.

If solid metal halides are to be separated, the apparatus, in connection with the concentration unit, comprises means for fractional separation of solid metal halides from the evaporated residual solution, means for further concentration of this residual solution and means for supplying the residual solution and optionally the separated solid metal halides to separate decomposition units.

The concentration unit is preferably a submerged combustion evaporator. When using a submerged combustion evaporator, the crystallized solid metal halide, for instance aluminum chloride, may be separated from the residual solution by inserting a centrifuge or filtering device after the submerged combustion evaporator. The separated residual solution which contains the other metal chlorides, may be passed back into the decomposition unit, or into the same submerged combustion evaporator, or into a separate submerged combustion evaporator. Another centrifuge or filtering device may be inserted after the second submerged combustion evaporator in order to separate the next-precipitated solid metal halide. The number of the submerged combustion evaporators and the separating means inserted thereafter may be increased, depending on how many different solid metal halides are to be separated.

The solid metal halides separated in the separating means may either be utilized as such, or processed together in a single decomposition unit, or, if the pure oxides are desired, may be processed in separate decomposition units.

The concentrate obtained in the concentration unit or units is usually a salt slurry that is just able to flow and which generally contains more than approximately 50 percent by weight of solids. This salt slurry and/or the solid metal halides obtained when using a separating means are decomposed in the decomposition unit or units at temperatures from approximately 600 to 1000°C, preferably of more than approximately 800°C, to form the corresponding hydrogen halides and metal oxides. Preferably, a fluidized bed reactor of known construction is used as the decomposition unit or units. It is also possible to use so-called "spray roasters" or so-called "high turbulence reactors." In the last-mentioned reactors, the material is treated in a zone of extremely high hot gas turbulence. All these decomposition means have the common feature of a stationary reaction chamber, and the heat treatment takes place in a short time and with high mass and heat transfer coefficients.

The term "metal oxides" as used throughout the specification also includes the hydroxides, oxide hydrates and the basic salts containing a more or less large residual proportion of halide ions.

Since the water content of the concentrate is only slightly above the minimum water content necessary for carrying out the reaction, the heat consumption for this decomposition process is very low since no excess solution water has to be evaporated. When using the above-mentioned decomposition means, the oxides are obtained in a finely divided form.

On the other hand, the reaction gases passing out of the decomposition unit contain relatively little water vapor and, since the heat consumption of the decomposition unit is low, only a small proportion of flue gases. Therefore, it is possible to obtain an acid having a sufficiently high concentration merely by absorption, without the necessity of providing an additional, expensive concentration.

The reaction gases have a temperature of at least 800°C at the exit of the decomposition unit; when entering the absorption means, their temperature should, however, not exceed about 100°C. It would be possible to cool the reaction gases directly by introducing a water spray. However, the resulting enrichment with water would contradict the demand for a high acid concentration. It has also been proposed to spray the chloride solution to be processed into the hot reaction gases resulting in a minor concentration of this solution. However, in this case, too, the enrichment of the decomposition gases with water vapor is disadvantageous.

Thus, it is advantageous to cool the reaction gases from the decomposition unit by means of an indirect heat exchanger. In view of the fact that the decomposition gases contain hydrogen halide, they attack metals, and it is proposed to manufacture the heat exchange surfaces of this heat exchanger out of graphite. This material is completely inert against hydrogen halides at any temperature. Since the heat transfer on the liquid-contacted side of the heat exchanger surfaces is high by a factor of several decades than at the gas-contacted side, there is no danger for the graphite in spite of the high gas inlet temperature because the temperature of the graphite is only slightly above the temperature of the cooling means.

These reaction gases contain practically all the heat introduced into the decomposition unit as fuel. Advantageously this heat is not passed into the cooling water, but utilized, preferably via a heat carrier, for the indirect heating of the vacuum units (preferably the second vacuum unit). It has been found particularly advantageous to increase the temperature of the cooling medium for the heat exchanger to such an extent, that the water in the heat exchanger will evaporate. This steam does not have to be pressurized.

In this way it is possible to save up to 25 percent of the energy which would otherwise be necessary for the evaporation of the halide solution. A further saving of energy is achieved by indirectly heating the vacuum units by the flue gases from the concentration unit.

The decomposition gases cooled to a temperature of between 100° and 150°C are passed into an absorption and condensation unit. If a moderately concentrated hydrohalic acid, for instance hydrochloric acid, having a concentration of approximately 20 percent by weight of HCl appears satisfactory, an adiabatic absorption column will be sufficient. If higher concentrations are required, an isothermic absorption will be necessary. Especially high concentrations may be achieved if the absorption and condensation unit comprises an isothermic and an adiabatic part. In the subsequent isothermic part which has the shape of a column, the gases are cooled to approximately 30°C. If the partial pressure of the HCl is sufficiently high, the predominent part of the stream will condense in this column. This water absorbs hydrogen chloride from the decomposition gases until an equilibrium concentration dependent on the temperature is achieved. This concentration may be up to 36 percent by weight. Preferably the halide-containing initial feed solution is used as the cooling medium for the isothermic part of the absorption unit.

The non-absorbed, excess hydrogen chloride is passed to an adiabatic column together with the combustion gases of the decomposition unit. Since the amount of water vapor which previously prevented a higher concentration has now largely been removed, it is possible to obtain in this column an acid having a concentration of up to 36 percent by weight if the operation conditions are selected properly. The acid from the isothermic and the adiabatic columns are finally combined.

The non-condensible gases are vented into the atmosphere, advantageously after a previous milk-of-lime washing. Preferably the condensate of the flue gases from the concentration steps is used as absorption liquid in the adiabatic column. This condensate is a dilute hydrochloric acid solution. It is permissible that, in the concentration step, a small proportion of the hydrogen chloride is driven out of the solution and is transferred into the condensate.

The following disclosure describes one embodiment of a plant for carrying out the present method with reference to the drawing. The process conditions and the elements of the plant may be varied within wide limits as will be recognized by those skilled in the art.

Referring to FIG. 1, pump 1 (made of plastics or ceramic material) conveys a chloride-containing solution having a temperature of approximately 20°C and a solids concentration of approximately 10 percent by weight, through the isothermic absorber 2, in which it is heated to approximately 70°C.

In the first vacuum unit comprising the heat exchanger 3 (graphite) and the vapor separator 4 (steel, rubber-lined) the solution is concentrated to a solids content of 13 percent by weight. The pressure in this unit is approximately 45 mm Hg, the boiling temperature approximately 43°C.

The pre-concentrate of this unit is then passed into the second vacuum unit comprising two heat exchangers 6 and 7 and a joint vapor separator 8. The pressure in this unit is about 180 mm Hg, the boiling point of the solution is about 66°C. The evaporation in this unit is carried out up to a solids concentration of 23 percent by weight. In view of the low relative increase in concentration, no deposition of crystals takes place within the two vacuum units. Thus, there is no danger of crust-forming on the heated surfaces.

Figure 2:
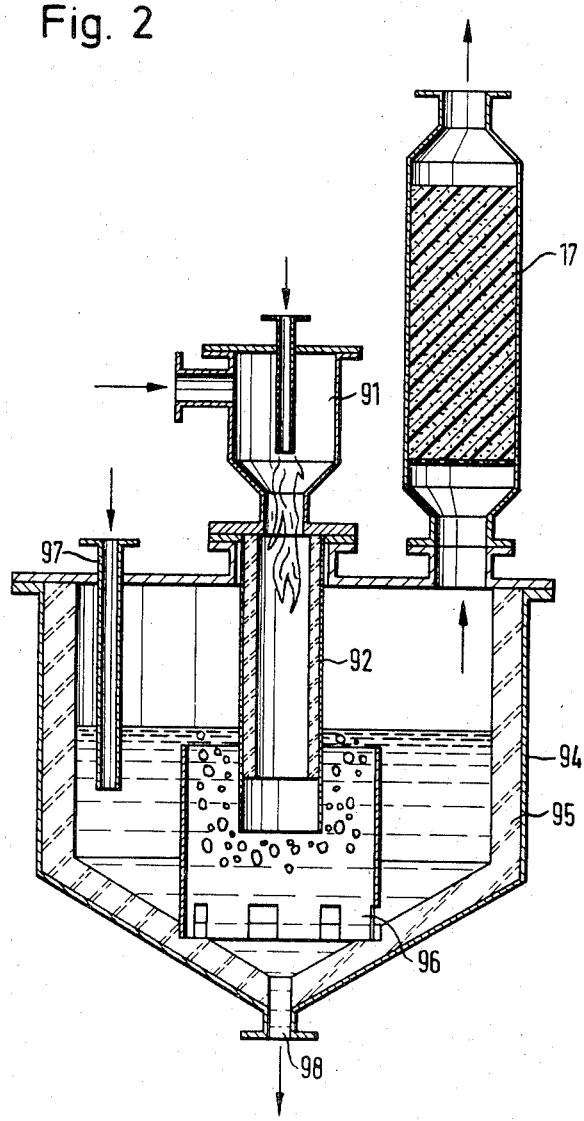
FIG. 2 is a vertical section through the submerged combustion evaporator.

This concentrate is then passed into the submerged combustion evaporator 9 in which it is further concentrated up to a solids content of approximately 60 percent by weight. The boiling point of this concentrate is approximately 120°C. The submerged combustion evaporator is illustrated in section in FIG. 2.

The submerged combustion evaporator 9 comprises (referring to FIG. 2) the burner 91 which is not substantially different from the common burners. It is provided with inlets for fuel oil or fuel gas and for combustion air, as well as with all fittings which are necessary for proper operation of a burner. Subsequent to the burner 91 there is a combustion chamber 92 the lower end of which is submerged in the solution to be concentrated; the combustion chamber is therefore generally called "immersion tube." This immersion tube 92 is totally or partially provided with a refractory lining in order to protect it against the heat of the flame. Burner 91 and immersion tube 92 are disposed in the cover of a burner vessel 94 which is approximately filled up half with the solution. The solution is introduced through the tube 97. The concentrate having a higher specific gravity is collected at the bottom and is withdrawn via the socket valve 98.

The circulation cylinder 96 ensures uniform mixing of the contents and is provided with slits or other openings in its lower end portion for this purpose. The combustion gases of the burner 91 pass through an opening in the cover of the burner vessel 94 together with the evaporated water, and are passed through the drop separator 17. In its most simple construction, the drop separator forms part of the flue gas tube having a larger diameter and being filled with a packing, for example with rings which prevent that droplets of the contents of the vessel are entrained in the gas stream. Since the combustion gases transfer their heat directly to the solution to be concentrated, all difficulties connected with the heat transfer through heated surfaces, such as the danger of corrosion and the danger of crust formation, are eliminated.

Naturally, all parts of the submerged combustion evaporator being in contact with the liquid to be evaporated, must be corrosion-resistant. The burner vessel 94 is generally provided with a ceramic lining 95 whereas the parts being less exposed to erosion and heat, such as the cover and drop separator 17, are provided with a plastics or rubber coatings. The circulation cylinder 96 and the immersion burner tube 92 are advantageously made from titanium if a chloride solution is to be evaporated.

In the submerged combustion evaporator, the solubility limit is surpassed. Generally no hard crystals will precipitate, but rather a crystal slurry having a honey-like consistency will be formed because part of the precipitated salts will be present in molten form at the boiling temperature of the concentrate.

It can also be desirable to separate crystals in the form of a single metal halide, for instance as aluminum chloride, from the solution by selecting adequate process conditions. Such fractional crystallization permits the separation of one component of the mixture in a relatively pure form. After the separation of the crystals, the remaining solution may again be passed into a submerged combustion evaporator and may be further concentration therein. Upon further evaporation, the next-crystallizing metal halide may be separated, and so on; such processing has the advantage that relatively small amounts of concentrate may be passed into and processed in the subsequent decomposition unit because the proportion of water can be maintained very low; on the other hand, it is possible to decompose the individual metal halides separately to form a highly concentrated hydrohalogen acid and relatively pure metal oxides. The metal oxides obtained by separate decomposition have a much higher commercial value than the corresponding oxide mixtures.

The vapors (steam and flue gases) escaping from the submerged combustion evaporator comprise approximately equal parts by weight of water vapor and combustion gases. Their condensation point is approximately 86°C. These vapors which are first passed through the drop separator 17, serve to heat the heat exchanger 6 of the second vacuum unit (FIG. 1).

Referring again to FIG. 1, the vapor exit temperature of the heat exchanger 6 is approximately 71°C; at this temperature approximately two-thirds of the steam contained in the vapors will condense releasing their heat of condensation.

The vapors of the second vacuum unit having a temperature of approximately 52°C serve to heat exchanger 3 of the first vacuum unit. The vapors escaping from this vacuum unit having a temperature of approximately 38°C are precipitated in an injection condenser 19.

The injection condenser was selected in view of the possible danger of corrosion since the vapors may contain traces of HCl. It is also possible to use a surface condenser.

The combustion gases contained in the vapors are evacuated at 20.

The concentrate of the submerged combustion evaporator is conveyed to the decomposition unit, preferably a fluidized bed reactor 12, e.g. by means of a screw conveyor pump 11, and an intermediate vessel 10 is intended to buffer fluctuations in the flow rate.

If the solid halides crystallized in the submerged combustion evaporator are to be subjected to fractional separation, the element 10 represents the means for separating the solid crystals from the concentrate, for instance a centrifuge or a filter device. The reference number 11 denotes a conveying means for the crystals, and the reference number 11' denotes the recirculation line for the solution which no longer contains solids and may be further evaporated in a submerged combustion evaporator.

The decomposition gases of the decomposition unit contain $H_2O$ and HCl in a weight ratio of approximately 1:1, and approximately twice the amount of flue gases. A dust separator 13 removes entrained oxide particles.

The decomposition gases have a temperature of approximately 850°C. Their latent heat is used in a heat exchanger 14 to generate low pressure steam which is used for heating the second heat exchanger 7 of the second vacuum unit.

Figure 3:
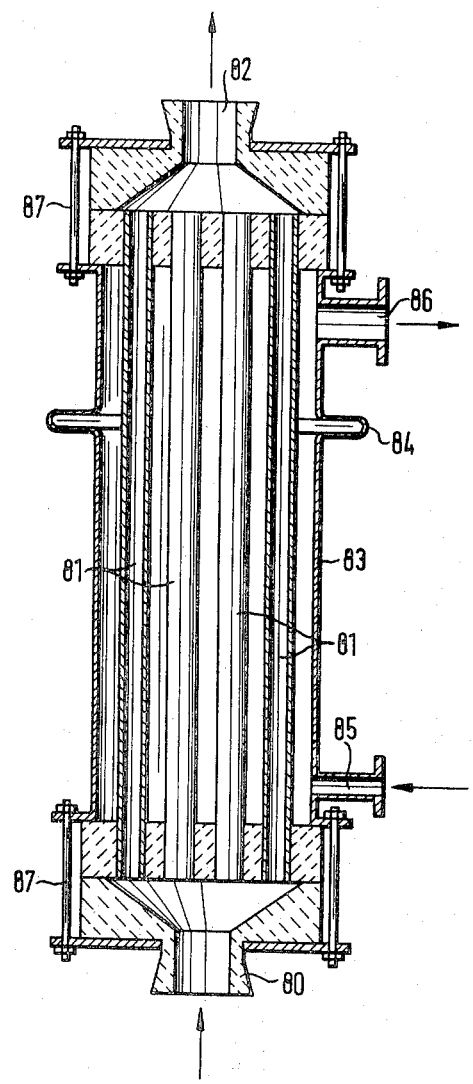
FIG. 3 is a vertical section through the heat exchanger.

A suitable construction of a heat exchanger 14 is shown in section in FIG. 3.

The hot decomposition gases entering through the socket 80 of graphite are passed through a plurality of tubes 81 which also consist of graphite. FIG. 3, for reasons of simplicity, only shows 4 tubes of this kind (two in section and two in front view).

The distribution of the decomposition gases over several tubes has the purpose of providing a larger surface available for the transfer of heat to the cooling water surrounding the tubes. The cooling water is introduced at the bottom at a temperature of approximately 60°C and withdrawn as steam at the top.

The amount of steam corresponds to approximately 25 percent of the total heat requirement of this step. However, the apparatus is designed in such a way that a 100 percent performance is obtained even if this steam is not available; in this case the total energy consumption will be higher.

The cooled reaction gases leave the heat exchanger 14 via socket 82 (made of graphite) at a temperature of approximately 120°C; this temperature is above the condensation point.

The assembly of tubes 81 is included in the jacket 83. Since graphite and steel have different heat expansion coefficients, jacket 83 includes an expansion loop 84 enabling the jacket to follow the movement of the tube assembly. Jacket and socket are fixed to each other by means of the vertical bolts 87. The cooling medium enters through the socket 85 and evaporates in contact with the tubes 81. The resulting steam is collected in the top of the apparatus and leaves the apparatus through the socket 86.

If this heat exchanger is used for the generation of steam, it is provided with all fittings necessary for proper operation of a steam boiler, such as safety valves, gauges and water level indicators.

Heat exchangers 2, 3, 6 and 7 (FIG. 1) are designed in a similar way; if the cooling medium is chemically agressive, the jacket 83 is provided with a suitable protective coating.

In the isothermic absorber 2 (made of graphite) the reaction gases are further cooled to approximately 40°C. At this temperature a major part of the water vapor contained in the reaction gas will condense and simultaneously absorb a part of the gaseous HCl to form hydrochloric acid. The incoming chloride-containing feed solution is used as the cooling agent.

Under the above-mentioned operating conditions, the theoretically possible concentration is approximately 36 percent by weight of HCl.

The partial pressure of the water vapor in the gases coming from the absorber 2 is very small whereas, on the other hand, there is an excess of hydrogen chloride because there is not enough absorption liquid. These gases are now passed into an adiabatic column 15 (for instance made of graphite, plastics, glass or rubber-coated steel), and absorbed in a known manner to form an acid having a concentration of approximately 34 percent; this acid is combined with the acid from the isothermic absorption. The condensate from the vapors of the submerged combustion evaporator coming from the second vacuum unit after separation of gas and liquid in the drop separator 18, is used as absorption liquid for the adiabatic absorber 15. By this means small amounts of HCl which are likely to escape from the submerged combustion evaporator, are trapped thus avoiding losses of HCl and contamination of the atmosphere.

The flue gases of the submerged combustion evaporator are passed through a gas scrubber 16 together with the waste gases of the adiabatic absorber. Thus scrubber, e.g. a venturi scrubber, also provides a slight negative pressure in the preceding units thus preventing the escape of HCl-containing gases through possible leaks. The scrubbing liquid is the waste water collecting in the pump 21 of the scrubber and consists of the condensate of the two vacuum units and the cooling water of the condenser 19. In order to obtain a final neutralization, lime milk or sodium hydroxide may be added to the gas scrubber.

What is claimed is:

1. Process for producing concentrated aqueous hydrohalogen acids and metal oxides from aqueous solutions of divalent and/or polyvalent metal halides which comprises:
   a. pre-concentrating said aqueous solution by indirect heat exchange;
   b. evaporating the pre-concentrated solution to a solids content of from about 40 to about 60 percent by weight by directly contacting said pre-concentrated solution with the combustion gases of a submerged combustion evaporator, and using the waste heat of said submerged combustion evaporator to pre-concentrate said aqueous solution in step (a);
   c. decomposing the evaporated concentrate at elevated temperatures in the presence of water vapor into the corresponding hydrogen halides and metal oxides;
   d. cooling the hydrogen halides; and
   e. recovering concentrated aqueous hydrohalogen acids and the corresponding metal oxides.

2. Process of claim 1 wherein said evaporated concentrate is decomposed at a temperature of from about 600° to about 1000°C.

3. Process of claim 1 wherein said decomposition is carried out in a stationary reaction chamber.

4. Process of claim 1 wherein said aqueous solution is pre-concentrated under vacuum in two consecutive stages, the heat required for one stage being supplied by the waste gases from evaporating step (b).

5. Process of claim 4 wherein the heat required for the first of said two stages is supplied by the waste gases from evaporating step (b) and the heat required for the second of said two stages is supplied by the reaction gases from decomposition step (c).

6. Process of claim 1 wherein the first metal halide to crystallize during evaporating step (b) is separated in solid form, the remaining solution is evaporated a second time as in step (b) and the first to crystallize metal halide and the evaporated concentrate from the second evaporation are decomposed in step (c).

7. Process of claim 6 wherein the second metal halide to crystallize during the second evaporation is separated in solid form, the remaining solution is evaporated a third time as in step (b) and the first and second metal halides to crystallize and the evaporated concentrate from the third evaporation are decomposed in step (c).

8. Process of claim 7 wherein the first to crystallize metal halide, the second to crystallize metal halide and the evaporated concentrate from the third evaporation are decomposed separately.

9. Process of claim 1 wherein the reaction gas containing hydrogen halide from decomposition step (c) is first cooled and then isothermically condensed and subsequently adiabatically absorbed to form concentrated aqueous hydrohalogen acid.

10. Process of claim 9 wherein said reaction gas is cooled by heat exchange with said aqueous solution during pre-concentration.

11. Process of claim 9 wherein the reaction gas is isothermically condensed in heat exchange with said aqueous solution prior to pre-concentration.

12. Process of claim 9 wherein the water-containing fluid gas from the evaporation step is used as the absorption liquid in the adiabatic absorption of said reaction gas.

13. Process of claim 1 wherein said aqueous solution contains a metal chloride or chlorides.

14. Process of claim 1 wherein said aqueous solution contains a chloride from the group of aluminum chloride, iron chloride, copper chloride, alkaline earth metal chlorides, and mixtures of the foregoing.

* * * * *